US012561813B2

(12) United States Patent
Li

(10) Patent No.: US 12,561,813 B2
(45) Date of Patent: Feb. 24, 2026

(54) IMAGE PROCESSING METHOD

(71) Applicant: NOVATEK Microelectronics Corp., Hsinchu (TW)

(72) Inventor: Ya-Lun Li, Hsinchu County (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 262 days.

(21) Appl. No.: 18/525,859

(22) Filed: Dec. 1, 2023

(65) Prior Publication Data

US 2025/0182292 A1    Jun. 5, 2025

(51) Int. Cl.

| | |
|---|---|
| ***G06T 7/20*** | (2017.01) |
| ***G06T 5/30*** | (2006.01) |
| ***G06T 5/50*** | (2006.01) |
| ***G06T 7/13*** | (2017.01) |

(52) U.S. Cl.

CPC .................. *G06T 7/13* (2017.01); *G06T 5/30* (2013.01); *G06T 5/50* (2013.01); *G06T 7/20* (2013.01); *G06T 2207/20224* (2013.01)

(58) Field of Classification Search

CPC .... G06T 7/13; G06T 5/30; G06T 5/50; G06T 7/20; G06T 2207/20224; G06V 20/62; G06V 20/635; G06V 20/46; G06V 30/1801

See application file for complete search history.

(56) References Cited

U.S. PATENT DOCUMENTS

| | | | | |
|---|---|---|---|---|
| 10,445,583 | B2 * | 10/2019 | Hu | H04N 7/013 |
| 2009/0016618 | A1 * | 1/2009 | Zhou | H04N 5/147 382/232 |
| 2012/0206567 | A1 | 8/2012 | Zafarifar et al. | |

FOREIGN PATENT DOCUMENTS

| | | | |
|---|---|---|---|
| CN | 101276416 | A | 10/2008 |
| CN | 112801090 | A | 5/2021 |
| CN | 116847210 | A | 10/2023 |
| TW | 201106276 | A1 | 2/2011 |

OTHER PUBLICATIONS

Michael R. Lyu et al., "A Comprehensive Method for Multilingual Video Text Detection, Localization, and Extraction", IEEE Transactions on Circuits and Systems for Video Technology, vol. 15, No. 2., IEEE. Feb. 2005, p. p. 243-p. p. 255.

* cited by examiner

*Primary Examiner* — Kent Yip

(74) *Attorney, Agent, or Firm* — CKC & Partners Co., LLC

(57) ABSTRACT

An image processing method is provided, including the following operations: generating, according to a refined edge map of a first frame in the video sequence, an edge sum image including row scores corresponding to rows in the refined edge map; generating first and second intensity difference images that indicate row differences in image data between adjacent rows of the rows; identifying, according to the edge sum image and the first to second intensity difference images, indices of a first text region and a first banner region that are in the first frame; determining whether the indices of the first text region and the first banner region in the first frame meet a stable condition; and performing image processing operation to the first text region when the indices of the first text region and the first banner region in the first frame meet the stable condition.

16 Claims, 9 Drawing Sheets

IMAGE PROCESSING METHOD

BACKGROUND

Field of Invention

The disclosure relates to an image processing method. More particularly, the disclosure relates to an image processing method involving detecting scrolling text region for image processing.

Description of Related Art

In the realm of image processing, identifying text regions within video sequences proves challenging due to the lack of clear edge information, particularly in videos featuring intricate backgrounds. Consequently, text detection may either falter in locating text or yield numerous false positives within the video stream. Ultimately, this can result in visual artifacts in interpolated frames, leading to viewer dissatisfaction with the enhanced video sequence.

SUMMARY

The disclosure provides an image processing method, including the following operations: generating, according to a refined edge map of a first frame in the video sequence, an edge sum image including row scores corresponding to rows in the refined edge map; generating first and second intensity difference images that indicate row differences in image data between adjacent rows of the rows; identifying, according to the edge sum image and the first to second intensity difference images, indices of a first text region and a first banner region that are in the first frame; determining whether the indices of the first text region and the first banner region in the first frame meet a stable condition; and performing image processing operation to the first text region when the indices of the first text region and the first banner region in the first frame meet the stable condition.

It is to be understood that both the foregoing general description and the following detailed description are demonstrated by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIGS. 11B-1C are schematic diagrams of parts of the image processing method of FIG. 1A, in accordance with some embodiments of the disclosure.

DETAILED DESCRIPTION

Figure 1A:
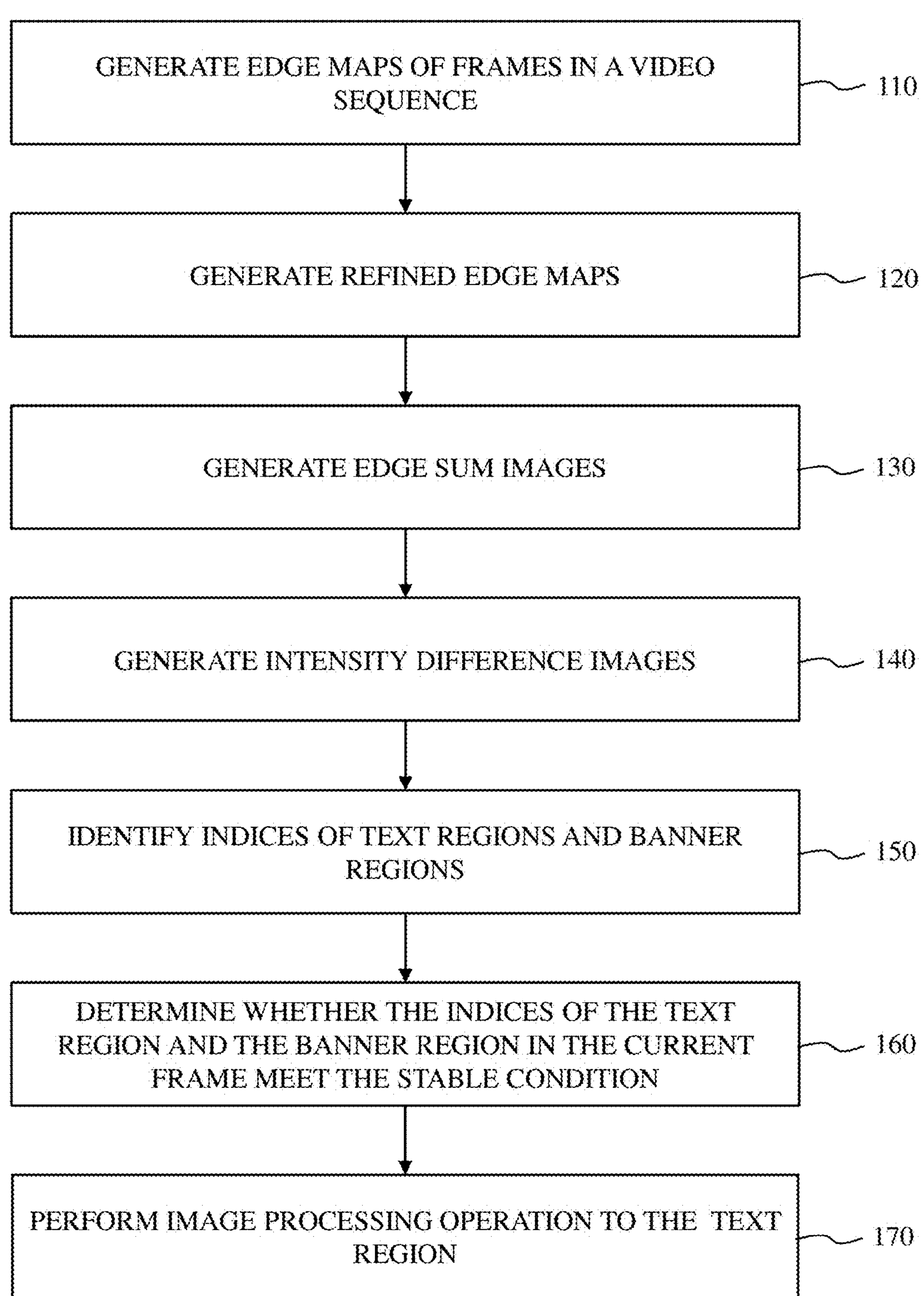
FIG. 1A is a schematic diagram of a flowchart of an image processing method on a video sequence, in accordance with some embodiments of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 1B:
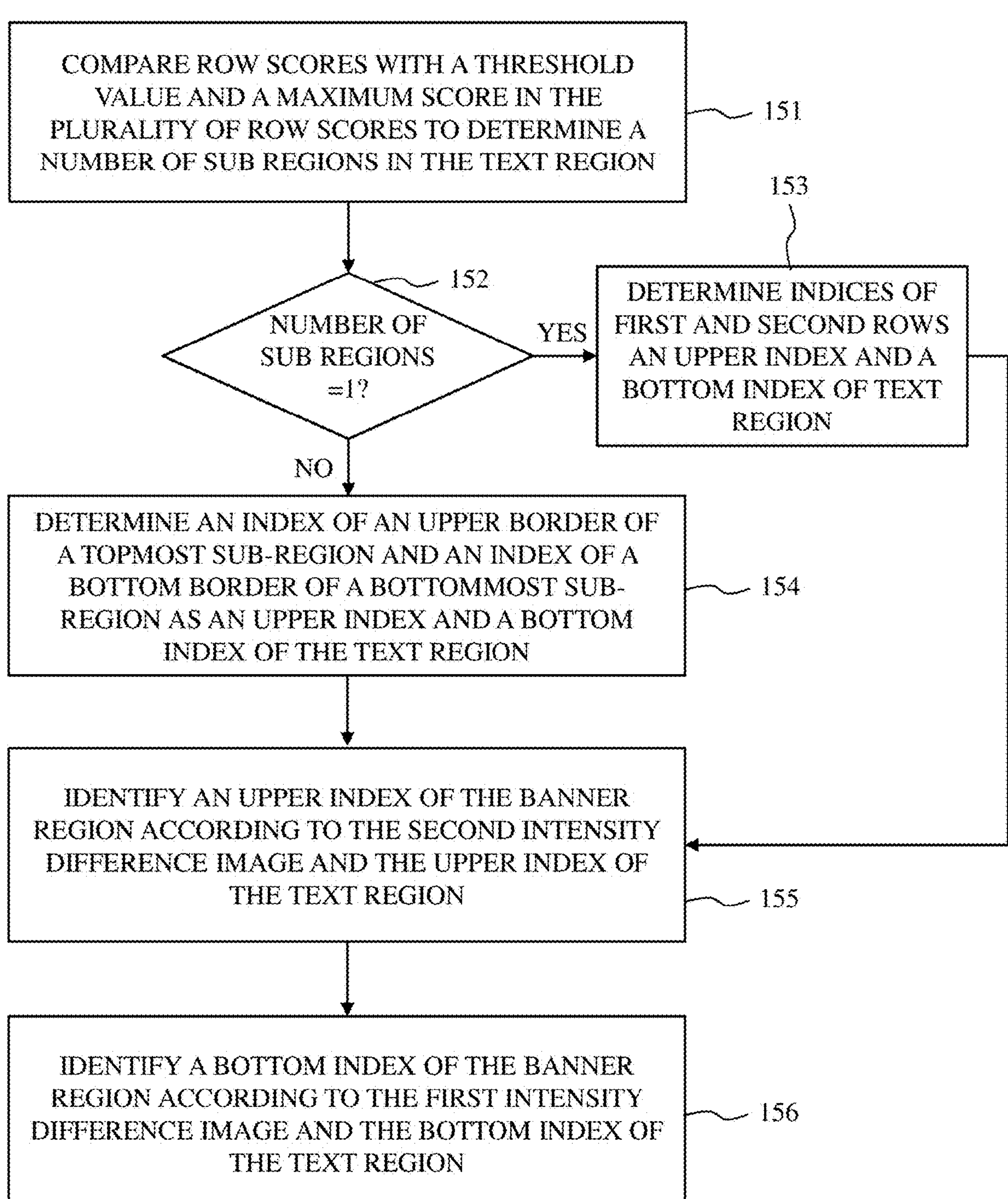

Reference is now made to FIG. 1. FIG. 1A is a schematic diagram of a flowchart of an image processing method 100 on a video sequence, in accordance with some embodiments of the disclosure. It is understood that additional operations can be provided before, during, and after the processes shown by FIG. 1A, and some of the operations described below can be replaced or eliminated, for additional embodiments of the method. The order of the operations/processes may be interchangeable. Throughout the various views and illustrative embodiments, like reference numbers are used to designate like elements. The image processing method 100 includes operations 110-170 that are described below with reference to the display device in FIGS. 1A-10.

In some embodiments, the image processing method 100 is performed by a display device, for example, a device that has video processing and displaying capabilities, for example, a television or a mobile phone. The display device may include an image processing circuit, a motion estimate and motion compensation (MEMC) circuit, and a display screen. The image processing circuit and the MEMC circuit may be two independent chips, or two modules in an integrated chip. Generally, the image processing circuit may be understood as a main chip of the display device. In some embodiments, the image processing circuit receives a video signal (sequence) and further performs the image processing method 100 with/without the MEMC circuit, and sends the frames to the display screen. The display screen completes displaying.

With reference to FIG. 1A, in the embodiments of the video sequence mixed with a video film or clip in one area of the frame and scrolling texts in the other area of the frame, different image processing operations are performed to enhance the quality of content in different areas. The image processing method 100 is performed on frames in the video sequence to detect scrolling texts in the video sequence and further to enhance display quality of the scrolling texts.

Figure 2:
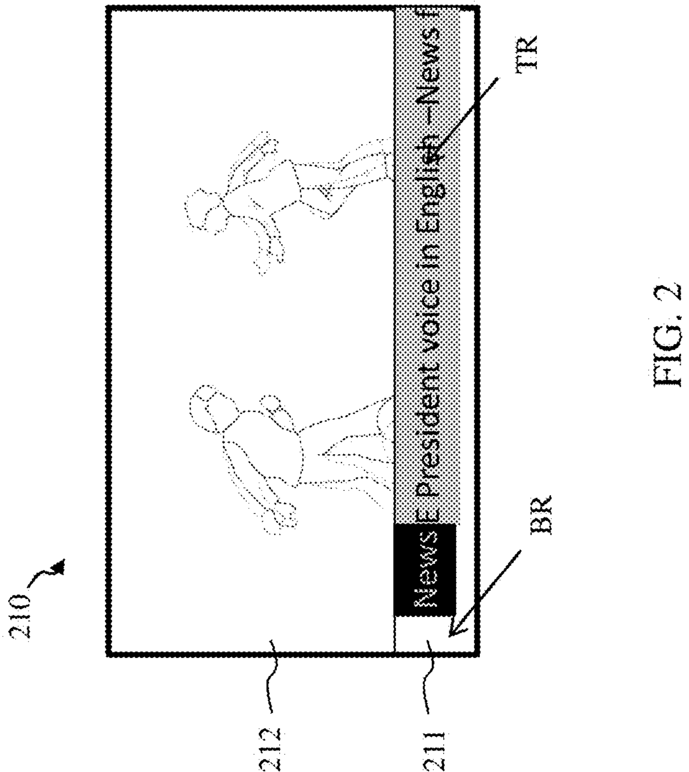
FIG. 2 is a schematic diagram of a frame in a video sequence, in accordance with some embodiments of the disclosure.

With reference to FIGS. 1A and 2, in operation 110, a (morphological) edge detection operation is performed to frames 210 in a video sequence to generate edge maps of the frames 210. For the sake of brevity, one frame 210 is depicted for the illustrative purposes of the operations in the image processing method 100. As shown in FIG. 2, the frame 210 includes at least two regions 211 and 212. The region 211 includes a banner region BR encompassing a text region TR, and the region 212 includes a film image. In some embodiments, the edge map of the frame 210 includes identified edges, curves, boundaries of objects and/or specific features of the content of the frame 210.

Figure 3:
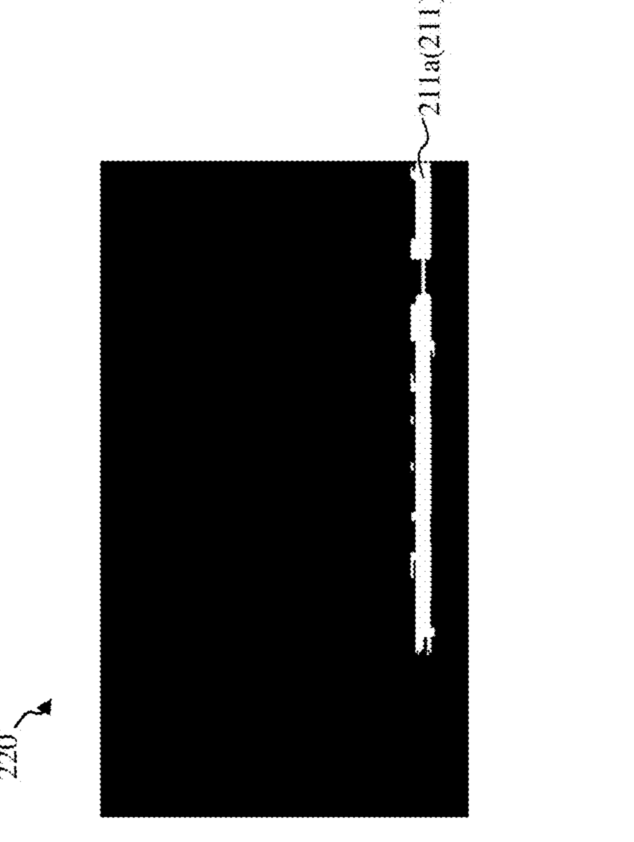
FIG. 3 is a schematic diagram of a refined edge map corresponding to the frame of FIG. 2, in accordance with some embodiments of the disclosure.

In operation 120, a refined edge map 220 showed in FIG. 3 is generated by performing image processing operation to eliminate undesired detected patterns in the edge map. For example, the boundaries of objects in the region 211 are referred to as outliers and removed/filtered out in the refined edge map 220. The refined edge map 220 depicts edge data showing in white area that correspond to text features in the region 211. In some embodiments, rows in the refined edge map 220 correspond to the rows in the frame 210.

In some embodiments of the video sequence having text content in the region 211 in default, the operations of generating the refined edge map 220 includes extracting the data of the region 211 in the edge map without outputting the data of the region 212.

Figure 4:
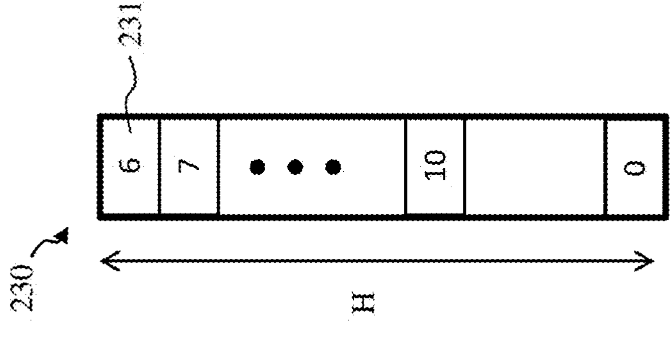
FIG. 4 is a schematic diagram of an edge sum image corresponding to the refined edge map of FIG. 3, in accordance with some embodiments of the disclosure.
Figure 4:
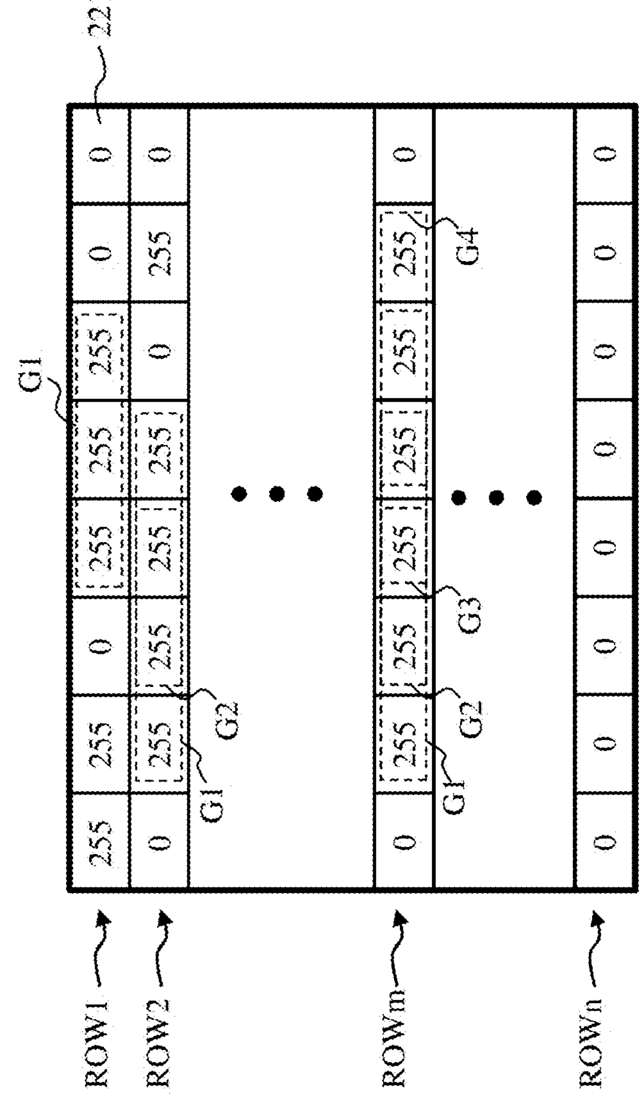

In operation 130, an edge sum image 230 as depicted in FIG. 4 is generated according to the refined edge map 220. The edge sum image 230 includes row scores that correspond to rows in the refined edge map 220. In some embodiments, the row score corresponding to a row equals to a sum of a number NW of pixels 221 having a predetermined value in a corresponding row and a number NC of three sequential pixels 221 having the predetermined value. In some embodiments, the pixels 221 having the predetermined value, for example, 255, indicates the positions where text content is in the frame 210 and the refined edge map 220. A height H of the edge sum image 230 equals to a number of rows in the refined edge map 220.

For example, as shown in FIG. 4, for the row ROW1 the number NW of pixels 221, having the value 255, is counted and equal to 5. In response to one group G1 of three sequential pixels 221 having the value 255, the number NC is equal to 1. Accordingly, the row score corresponding to the row ROW1 is 6 in the edge sum image 230. Similarly, the row score corresponding to the row ROW2 is 7 (a sum of NW=5, NC=2.) The row score corresponding to the row ROWm is 10 (a sum of NW=6, NC=4.) The row score corresponding to the row ROWn is 0 (a sum of NW=0, NC=0.)

In some embodiments, the image processing method 100 further includes operations of comparing the row scores corresponding to the rows in the region 211 to generate a maximum score. For example, the maximum score in the edge sum image 230 is 10.

Figures 5, 6:
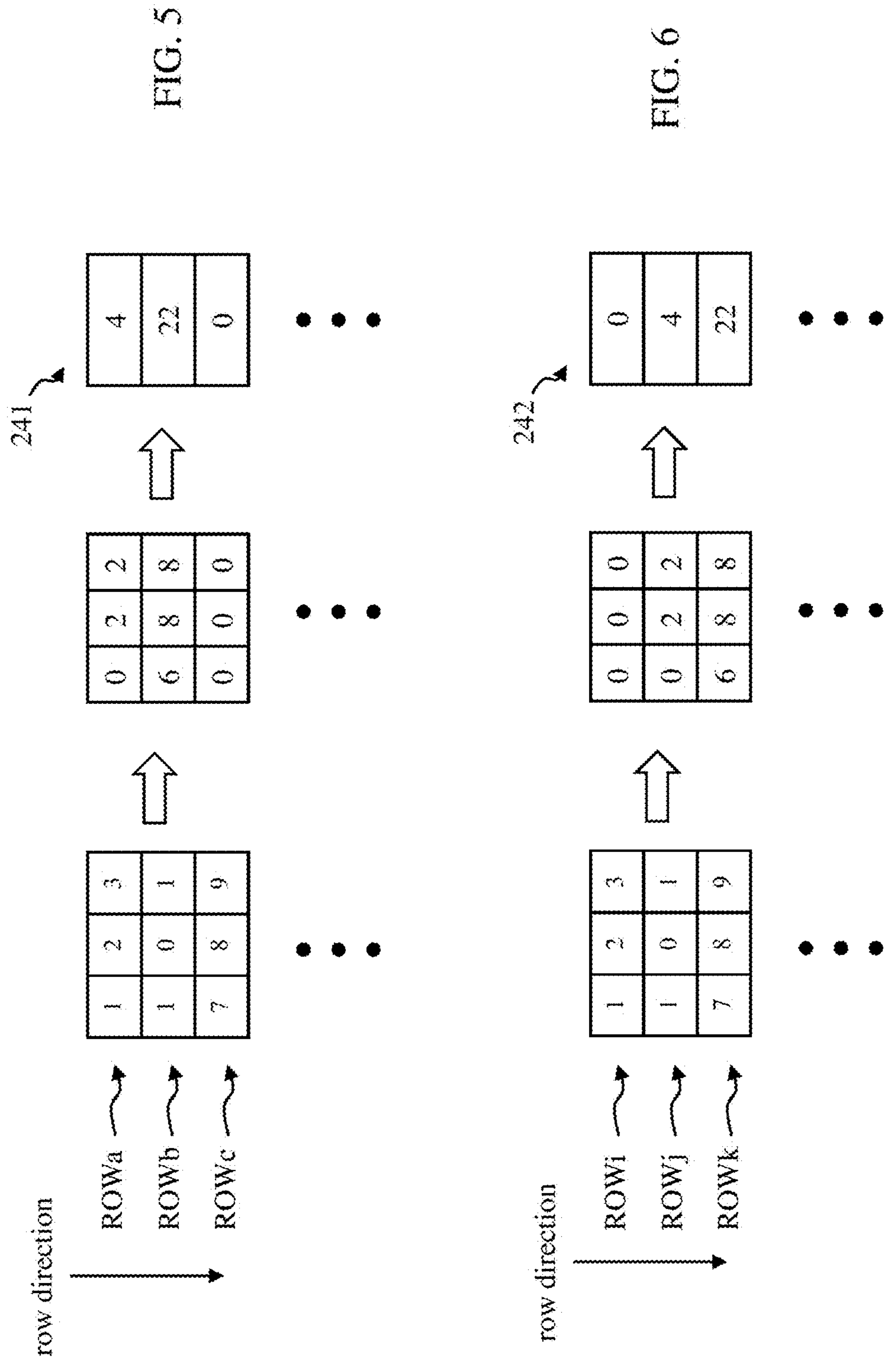
FIG. 5 is a schematic diagram of an intensity difference image corresponding to the frame of FIG. 2, in accordance with some embodiments of the disclosure.
FIG. 6 is a schematic diagram of an intensity difference image corresponding to the frame of FIG. 2, in accordance with some embodiments of the disclosure.

In operation 140, intensity difference images 241-242 that indicate row differences in image data between adjacent rows of the rows in the frame 210 are generated. Reference is now made to FIGS. 5-6. FIGS. 5-6 are schematic diagrams of the intensity difference images 241-242 corresponding to the frame 210 of FIG. 2, in accordance with some embodiments of the disclosure.

In the embodiments of generating the intensity difference image 241, absolute difference between the image data, for example, Y (Luma) value in the YUV color model, of every two adjacent rows of the rows in the frame 210 along a reversed row direction are calculated. For example, in FIG. 5, image data of three rows ROWa-ROWc in the frame 210 are given for illustrative purposes. The image data (e.g., (1, 2, 3)) of the row ROWa subtracted from the image data of the row ROWb (e.g., (1, 0, 1)) are (0, −2, −2,) and the absolute difference is (0, 2, 2.) The image data (e.g., (1, 0, 1)) of the row ROWb subtracted from the image data of the row ROWc (e.g., (7, 8, 9)) are (6, 8, 8.) The intensity difference image 241 includes row differences that equal to sums of absolute differences in the rows. For example, the row difference between the rows ROWa-ROWb equals to 0+2+2=4. Similarly, the difference between the rows ROWb-ROWc equals to 6+8+8=22.

In the embodiments of generating the intensity difference image 242, absolute difference between the image data of every two adjacent rows of the rows in the frame 210 along a row direction are calculated. For example, in FIG. 6, image data of three rows ROWi-ROWk in the frame 210 are given for illustrative purposes. The image data (e.g., (1, 0, 1)) of the row ROWj subtracted from the image data of the row ROWi (e.g., (1,2,3)) are (0, 2, 2.) The image data (e.g., (7, 8, 9)) of the row ROWk subtracted from the image data of the row ROWj (e.g., (1, 0, 1)) are (−6, −8, −8,) and the absolute difference is (6, 8, 8.) The intensity difference image 242 includes row differences that equal to sums of absolute differences in the rows. For example, the row difference between the rows ROWi-ROWj equals to 0+2+2=4. Similarly, the difference between the rows ROWj-ROWk equals to 6+8+8=22.

In operation 150, indices of the text region TR and the banner region in the frame 210 are identified according to the edge sum image 230 and the intensity difference images 241-242. Specifically, with reference to FIG. 1B which is schematic diagrams of parts of the image processing method 100 of FIG. 1A, operation 150 further includes operations 151-156.

According to operation 151, the row scores are compared with a threshold value TH1 and the maximum score in the row scores to determine a number of sub regions in the text region TR. For example, the row scores corresponding to the rows in the edge sum image 230 are compared with the maximum score in the row scores. In some embodiments, when differences between the maximum score and the row scores corresponding to the rows in a certain region are smaller than a threshold value TH2, indices of a top row and a bottom row are determined as indices of the certain area where text content exists. In other embodiments, when the row scores corresponding to the rows in a certain region are smaller than or equal to the threshold value TH1, indicating that the certain region does not include feature similar to the text content.

In operation 152, when the number of the sub regions in the text region TR equals to 1, operation 153 is performed; otherwise, operation 154 is performed.

Figure 7:
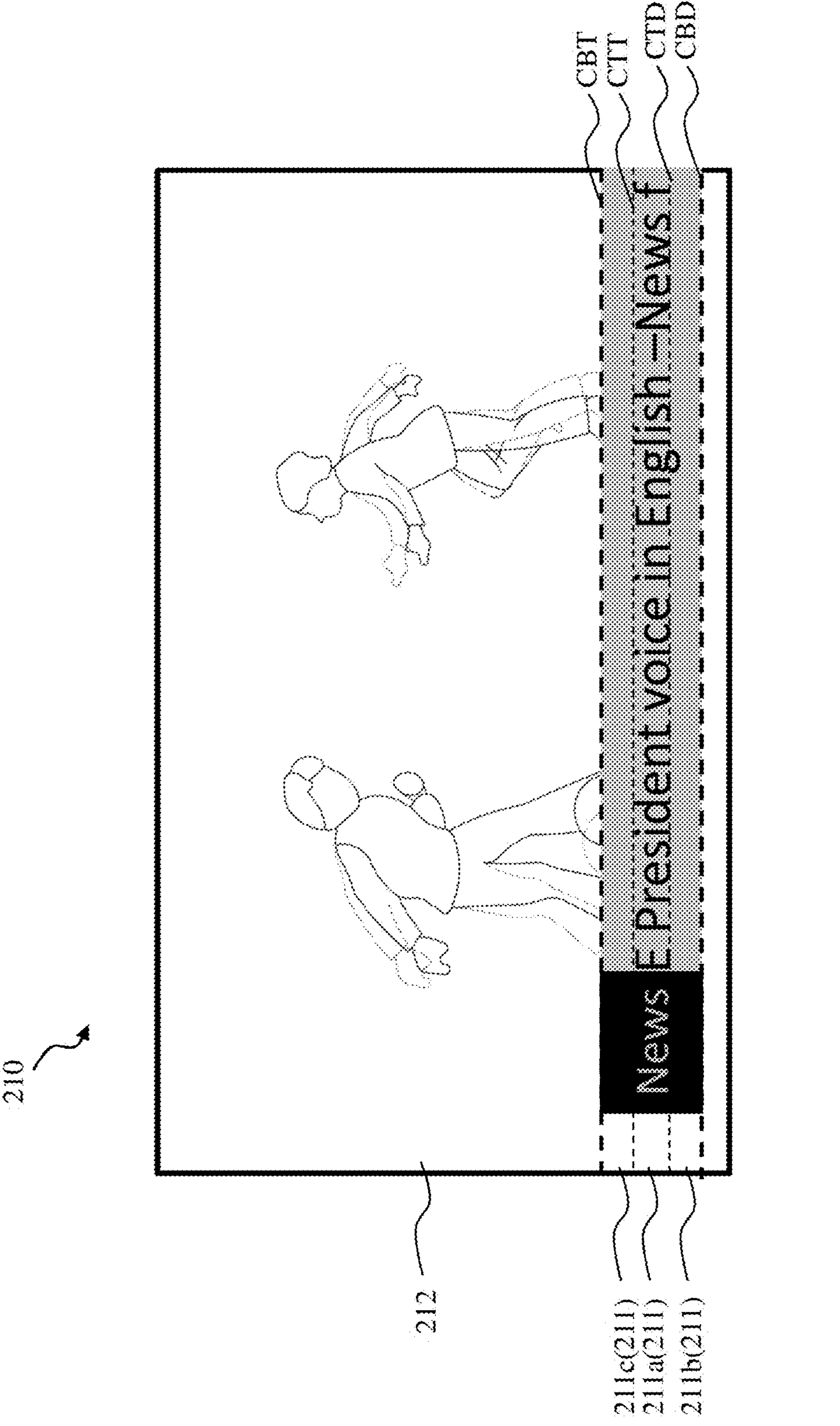
FIG. 7 is a schematic diagram of the frame corresponding to FIG. 2 having indicative borders, in accordance with some embodiments of the disclosure.

For example, with reference to in FIGS. 3 and 7, according to operation 153, the differences between the maximum score and the row scores corresponding to the rows in a sub region 211*a* are smaller than the threshold value TH2, the indices of the top row (e.g., a top row of rows in the sub region 211*a*, corresponding to a border CTT in FIG. 7) and the bottom row (e.g., a bottom row of the rows in the sub region 211*a*, corresponding to a border CTD in FIG. 7) are determined as the indices of the sub region 211*a*. As there is no other region having rows with small difference between row scores and the maximum score, the frame 210 is determined to have one sub region, the indices of the sub region 211*a* determined as an upper index and a bottom index of the text region TR of the frame 210. Alternatively stated, the frame 210 has the text region TR that includes one row of text content.

Figures 8, 9:
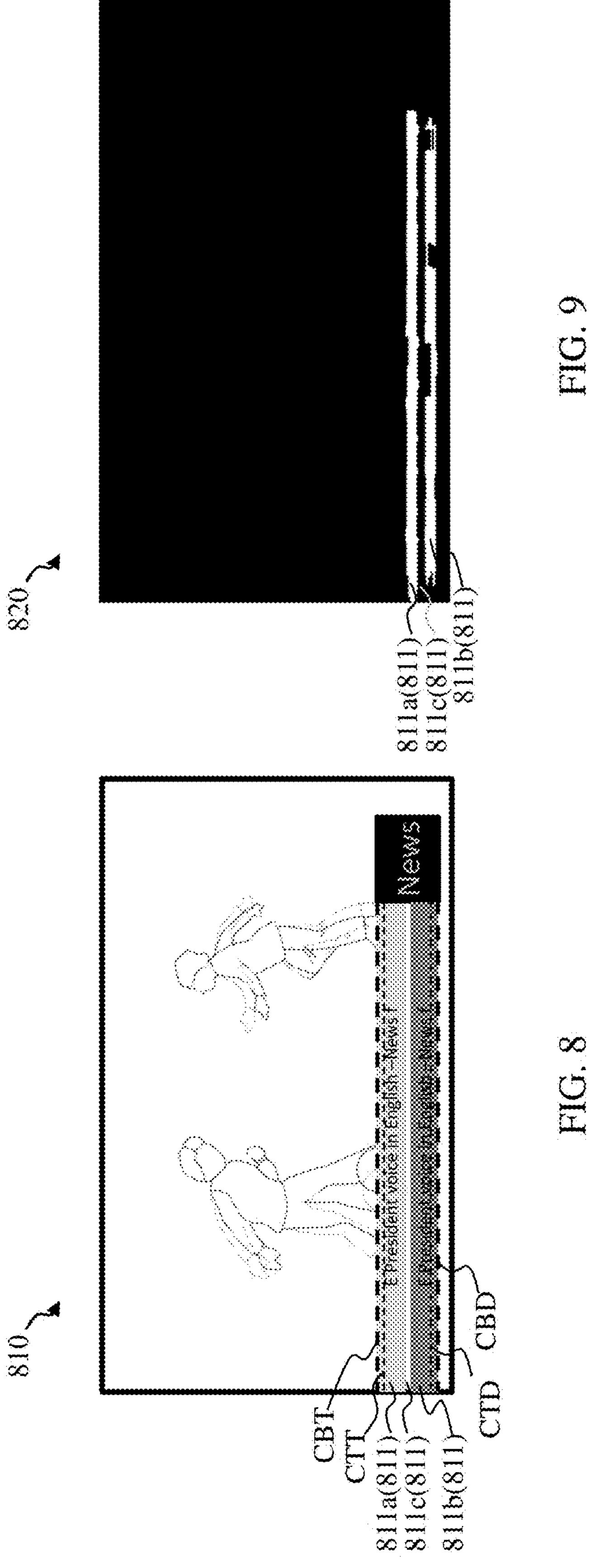
FIG. 8 is a schematic diagram of a frame in a video sequence, in accordance with some embodiments of the disclosure.
FIG. 9 is a schematic diagram of a refined edge map corresponding to the frame of FIG. 8, in accordance with some embodiments of the disclosure.

In other embodiments, operation 154 is performed with reference to FIGS. 8-9. A frame 810 is configured with respect to, for example, the frame 210 of FIG. 2. The frame 810 is determined to have two sub regions 811*a*-811*b* and a static region 811*c* interposed between the sub regions 811*a*-811*b*. Specifically, differences between the maximum score and the row scores corresponding to the rows in the sub regions 811a-811b are smaller than the threshold value TH2. Differences between the maximum score and the row scores corresponding to the rows in the static region 811c are smaller than or equal to the threshold value TH1. Accordingly, a topmost sub region 811a is determined as an upper index of the text region TR and an index of a bottom border CTD of the bottommost sub region 811b is determined as a bottom index of the text region TR.

In operation 155, an upper index (corresponding to a border CBT in FIG. 7) of the banner region BR is identified according to the intensity difference image 242 and the upper index of the text region TR. With continued reference to the embodiments of FIG. 7, an index of a row, above the upper border CTT (i.e., the upper index of the text region TR,) is determined as the upper index of the banner region BR when the aforementioned row has a corresponding row difference that is the first largest value in the intensity difference image 242 with respect to the upper border CTT. Alternatively stated, a significant edge difference between the region 212, having the film image, and the region 211 having text content, occurs at the upper border CTT.

Similarly, in operation 156, a bottom index (corresponding to a border CBD in FIG. 7) of the banner region BR is identified according to the intensity difference image 241 and the bottom index of the text region TR. In FIG. 7, an index of a row, below the bottom border CTD (i.e., the bottom index of the text region TR,) is determined as the bottom index of the banner region BR when aforementioned row has a corresponding row difference that is the first largest row difference in the intensity difference image 241 with respect to the bottom border CTD.

Figure 10:
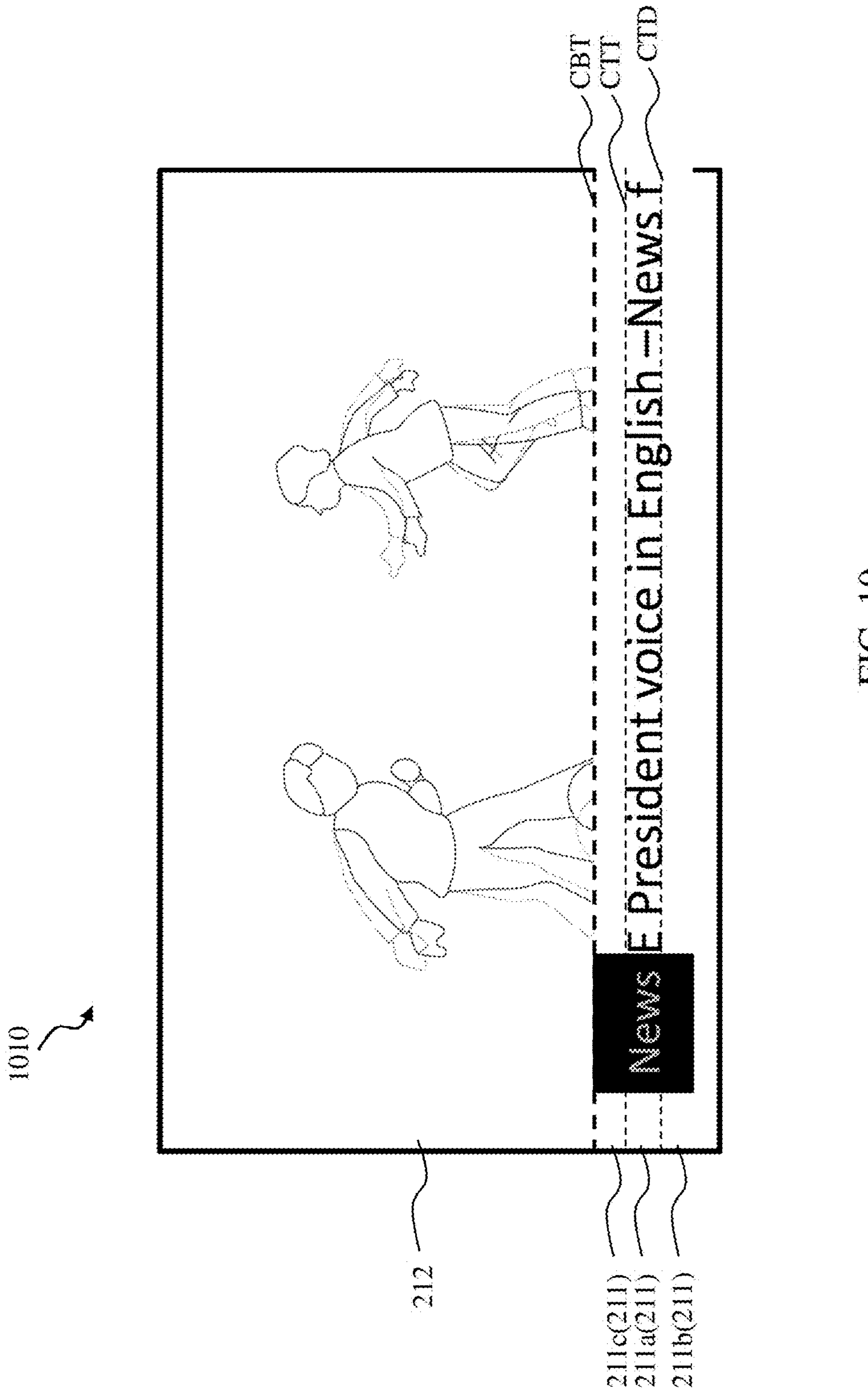
FIG. 10 is a schematic diagram of a frame in a video sequence, in accordance with some embodiments of the disclosure.

In some embodiments, as shown in a frame 1010 of FIG. 10, when image data of the region below the sub region 211a (the text region TR) are not distinguishable from the other region in the region 211, an index of a row below the sub region 211a is determined as the bottom index of the banner region BR when said row has a corresponding row difference RD1 that is the smallest row difference in the intensity difference image 241. Alternatively stated, said row has the corresponding row difference RD1 that is smaller than a sum of a threshold value TH3 and a previous row difference RD2, in which the previous row difference RD2 is greater than the corresponding row difference RD1. In some embodiments, the row corresponding to the previous row difference RD2 is above said row having the corresponding row difference RD1.

Figure 1C:
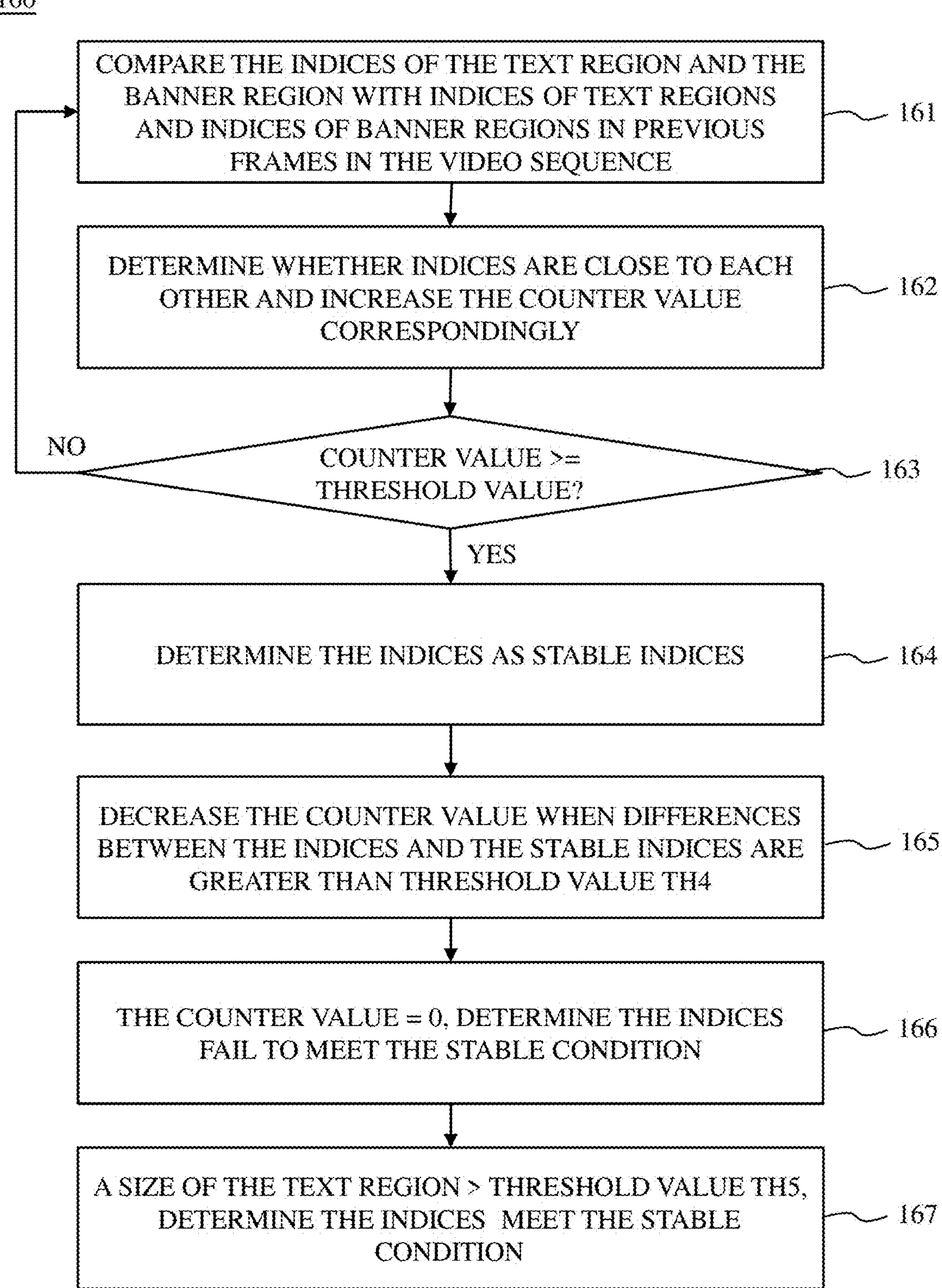

After operation 150 is performed, in operation 160, whether the indices of the text region TR and the banner region BR in the frame meet a stable condition is determined. Reference is now made to FIG. 1C. FIG. 1C is schematic diagrams of parts of the image processing method 100 of FIG. 1A, operation 160 further includes operations 161-167.

In operation 161, the indices of four borders (e.g., borders CTT, CTD, CBT, CBD) of the text region and the banner region in the frame, for example, 210 in FIG. 7, are compared with the indices of the text region and the banner region in previous frames in the video sequence. For instance, the indices of the current frame 210 (referred to as indices(t)) are compared with indices of a frame (referred to as indices(t−1)) that is one frame before the current frame 210 and also compared with indices of a frame (referred to as indices(t−2)) that is two frames before the current frame 210.

In operation 162, whether the indices of the current frame 210 are close to the indices of previous two frames is determined. Specifically, when both of the absolute difference between the indices (t) and the indices(t−1) and the absolute difference between the indices (t) and the indices (t−2) are smaller than or equal to a threshold value TH4, a counter value increases by a threshold value TH5 accordingly.

According to operation 163, the counter value is compared with a threshold value TH6. When the counter value does not exceed or equal to the threshold value TH6, operation 161 is performed; otherwise, operation 164 is performed.

In operation 164, the indices of the current frame 210 are determined as stable indices.

In some embodiments, during operation 165, as differences between the indices of the current frame 210 and the stable indices are greater than the threshold value TH4, the counter value decreases.

In some embodiments, according to operation 166, when the counter value is equal to or smaller than 0, the indices of the current frame 210 are determined to be unstable, failing to meet the stable condition. In some embodiments, it indicates that the text region TR is the current frame 210 disappears.

In some embodiments, the image processing method 100 repeats operations 161-164 to obtain instant stable indices as continuously processing frames in the video sequence. Accordingly, when the indices of the current frame does not fulfill the stable condition and the stable indices for comparison in operation 165 are eliminated, the instant stable indices are applied as the stable indices for the following frame to be processed by the image processing method 100.

In operation 167, the indices of the text region TR and the banner region BR are determined to meet the stable condition when a size, based on the stable indices, of the text region TR is greater than a threshold value TH5. For example, a height of the text region TR along the row direction is generated by subtracting the bottom index of the text region TR from the upper index of the text region TR. When the height of the text region TR is large enough and the indices of frames are close to each other, it is determined that text region TR in the video sequence is stable and the positions thereof is determined through the image processing method 100.

After the operation 167 is performed, with reference to FIG. 1A, image processing operation is performed to the text region TR according to operation 170. For example, in some embodiments, dilation operation is performed to the text region TR to enhance the edge detection operation of text content in the text region TR of the frame through taking the dilation of the original text content, thus highlighting just those new pixels at the edges of features that are added by the dilation. Accordingly, the edge features of, for example, the text context are more distinctive and the accuracy.

In various embodiments, the image processing method 100 further includes operations of removing other features (referred to as outliers) outside of the banner region BR according to the indices of the borders CBT and CBD.

In some embodiments, performing the image processing operation includes performing a motion estimate and motion compensation (MEMC) operation to the text region TR in a normal mode. For example, with reference to FIG. 10, the MEMC operation is performed to the text region TR to apply frame interpolation, smoothening up scrolling texts in the text region TR and further enhancing picture quality of the video sequence. For example, scrolling texts of the text region TR is protected from ghosting and/or blurring.

According to some embodiments, the image processing method 100 further includes operations of performing the MEMC operation in a fallback mode to a region that includes a film image in the frame while the MEMC operation is performed to the text region TR. Specifically, as shown in FIG. 10, differences of motion vectors in the region 212 within the current frame and previous frame are estimated to generate a fallback level of the MEMC operation. For example, in some embodiments, when the differences of motion vectors are large, the fallback level is correspondingly high, the MEMC operation reducing motion compensation in the region 212 and applying blend data of I frame (e.g., the current frame) and P frame (e.g., the next frame) corresponding to the region 212. In various embodiments, no motion compensation operation is performed to the region 212 and the blend data of the I frame and the P frame is displayed.

In some approaches, edge-based method is applied to detect scrolling text in a mixed-mode video. However, missing information, localization errors, and false edges cause the inaccuracy of scrolling text map, deteriorating image processing operation and/or picture quality in displaying.

Compared with the approaches, with the configurations of the present application, borders of text regions and banner regions are detected and the stability thereof is verified. Accordingly, all information encompassed in the text regions and the banner regions are processed, without suffering from inaccurate positioning, and poor detection accuracy. It provides improved detection of scrolling text for further image processing operation.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image processing method on a video sequence, comprising:

generating, according to a refined edge map of a first frame in the video sequence, an edge sum image including a plurality of row scores corresponding to a plurality of rows in the refined edge map;

generating a first intensity difference image and a second intensity difference image that indicate row differences in image data between adjacent rows of the plurality of rows in the first frame;

identifying, according to the edge sum image and the first to second intensity difference images, indices of a first text region and a first banner region that are in the first frame;

determining whether the indices of the first text region and the first banner region in the first frame meet a stable condition; and performing image processing operation to the first text region being displayed when the indices of the first text region and the first banner region in the first frame meet the stable condition.

2. The image processing method of claim 1, further comprising:

performing an edge detection operation to the first frame to generate an edge map; and extracting a first region of the first frame to generate the refined edge map, wherein the first region includes the first text region and the first banner region, and a second region, different from the first region, of the first frame includes a film image.

3. The image processing method of claim 1, wherein generating the edge sum image comprises:

counting a first number of pixels having a first value in each of the plurality of rows;

counting a second number of three sequential pixels that have the first value in each of the plurality of rows; and summing up the first number and the second number that correspond to one in the plurality of rows to generate a corresponding row score of the one in the plurality of rows.

4. The image processing method of claim 3, further comprising:

comparing the plurality of row scores of a portion in the plurality of rows to generate a maximum score, wherein the portion in the plurality of rows corresponds to a first region of the first frame, wherein the first region includes the first text region and the first banner region, and a second region, different from the first region, of the first frame includes a film image.

5. The image processing method of claim 1, wherein generating the first to second intensity difference images comprises:

generating first differences between the image data of every two adjacent rows of the plurality of rows in the first frame along a reversed row direction and summing the first differences to generate the row differences in the first intensity difference image; and generating second differences between the image data of every two adjacent rows of the plurality of rows in the first frame along a row direction and summing the second differences to generate the row differences in the second intensity difference image.

6. The image processing method of claim 1, wherein identifying the indices of the first text region comprises:

determining indices of first and second rows in a first portion of the plurality of rows as an upper index and a bottom index of the first text region when differences between a maximum score in the plurality of row scores and the row scores corresponding to the first portion of the plurality of rows are smaller than a threshold value, wherein the first row is an uppermost row in the first portion of the plurality of rows, and the second row is a bottommost row in the first portion of the plurality of rows.

7. The image processing method of claim 6, wherein identifying the indices of the first banner region comprises:

identifying a bottom index of the first banner region according to the first intensity difference image and the bottom index of the first text region; and identifying an upper index of the first banner region according to the second intensity difference image and the upper index of the first text region.

8. The image processing method of claim 7, wherein identifying the bottom index of the first banner region comprises:

determining an index of a row in a second portion in the plurality of rows as the bottom index of the first banner region when the row in the second portion has a largest row difference in the first intensity difference image;

wherein identifying the upper index of the first banner region comprises:

determining an index of a row in a third portion in the plurality of rows as the upper index of the first banner region when the row in the third portion has a largest row difference in the second intensity difference image, wherein the first portion of the plurality of rows are interposed between the second to third portions of the plurality of rows.

9. The image processing method of claim 1, wherein identifying the indices of the first text region and the first banner region comprises:

comparing the plurality of row scores with a first threshold value and a maximum score in the plurality of row scores to determine a number of sub regions in the first text region;

when the number of the sub regions is greater than 1, determining an index of an upper border of a topmost sub region in the sub regions and an index of a bottom border of a bottommost sub region in the sub regions as an upper index and a bottom index of the first text region respectively;

identifying a bottom index of the first banner region according to the first intensity difference image and the bottom index of the first text region; and identifying an upper index of the first banner region according to the second intensity difference image and the upper index of the first text region.

10. The image processing method of claim 9, wherein identifying the bottom index of the first banner region comprises:

determining an index of a row, below the first text region, in the plurality of rows as the bottom index of the first banner region when the row has a corresponding row difference that is smaller than a sum of a second threshold value and a previous row difference.

11. The image processing method of claim 1, wherein determining whether the indices of the first text region and the first banner region in the first frame meet the stable condition comprises:

comparing the indices of the first text region and the first banner region with stable indices and indices of second text regions and indices of second banner regions in second frames in the video sequence to determine the indices of the first text region and the first banner region as the stable indices; and determining the indices of the first text region and the first banner region meet the stable condition when a size, based on the stable indices, of the first text region is greater than a first threshold value.

12. The image processing method of claim 11, wherein determining whether the indices of the first text region and the first banner region in the first frame meet the stable condition further comprises:

increasing a counter value in response to difference between the indices of the first text region and the first banner region and the indices of the second text regions and the indices of the second banner regions being smaller than a second threshold value; and when the counter value is equal to or greater than a third threshold value, determining the indices of the first text region and the first banner region as the stable indices.

13. The image processing method of claim 12, wherein determining whether the indices of the first text region and the first banner region in the first frame meet the stable condition further comprises:

decreasing the counter value in response to the difference between the indices of the first text region and the first banner region and the stable indices being greater than the second threshold value; and when the counter value is equal to zero, determining the indices of the first text region and the first banner region fail to meet the stable condition.

14. The image processing method of claim 1, wherein performing the image processing operation comprises:

performing dilation operation to the first text region to enhance an edge detection operation of text content in the first text region.

15. The image processing method of claim 1, wherein performing the image processing operation comprises:

performing a motion estimate and motion compensation (MEMC) operation to the first text region.

16. The image processing method of claim 15, further comprising:

performing the motion estimate and motion compensation operation in a fallback mode to a region including a film image in the first frame while the MEMC operation is performed to the first text region.

* * * * *